US012753282B2

(12) United States Patent
Kuboyama

(10) Patent No.: US 12,753,282 B2
(45) Date of Patent: Oct. 6, 2026

(54) CURABLE COMPOSITION, AND CURED COATING, ARTICLE, AND METHOD FOR FORMING COATING USING THE SAME

(71) Applicant: THREEBOND CO., LTD., Hachioji (JP)

(72) Inventor: Toshifumi Kuboyama, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 513 days.

(21) Appl. No.: 18/549,777

(22) PCT Filed: Mar. 8, 2022

(86) PCT No.: PCT/JP2022/009959
§ 371 (c)(1),
(2) Date: Sep. 8, 2023

(87) PCT Pub. No.: WO2022/196430
PCT Pub. Date: Sep. 22, 2022

(65) Prior Publication Data

US 2024/0209157 A1 Jun. 27, 2024

(30) Foreign Application Priority Data

Mar. 17, 2021 (JP) ................................ 2021-043634

(51) Int. Cl.
*C08G 77/54* (2006.01)
*C08G 77/08* (2006.01)
*C08G 77/26* (2006.01)
*C08K 5/5419* (2006.01)
*C09D 183/14* (2006.01)

(52) U.S. Cl.
CPC ............. *C08G 77/54* (2013.01); *C08G 77/08* (2013.01); *C08G 77/26* (2013.01); *C08K 5/5419* (2013.01); *C09D 183/14* (2013.01)

(58) Field of Classification Search
CPC ........ C08G 77/54; C08G 77/20; C08G 77/18; C08G 77/16; C08G 77/26; C08G 77/14
See application file for complete search history.

(56) References Cited

U.S. PATENT DOCUMENTS 4,678,688 A 7/1987 Itoh et al.
2016/0177133 A1 6/2016 Lim et al.
2018/0312641 A1 11/2018 Ralf et al.
2021/0095079 A1* 4/2021 Kawakami .............. C08L 83/14

FOREIGN PATENT DOCUMENTS

EP 3546498 A1 10/2019
EP 3798252 A1 3/2021
JP S60-221470 A 11/1985
JP 2004-051810 * 2/2004
JP 2014-139301 A 7/2014
JP 2016-117881 A 6/2016
JP 2018-534400 A 11/2018
JP 2021-055052 A 4/2021
KR 10-1583232 B1 1/2016
KR 20190114816 A 10/2019

OTHER PUBLICATIONS

Translation of JP 2004-051810 (Year: 2004).*
International Search Report dated May 17, 2022 for the corresponding patent application No. PCT/JP2022/009959, with English translation.
Office Action, dated Jan. 20, 2026, which was issued for the corresponding Japanese Patent Application No. 2023-506991, 9 pages, with English translation.
Extended European Search Report, dated Feb. 4, 2025, issued for the corresponding European Patent Application No. 22771182.7, 9 pages.
Office Action, mailed on Jun. 18, 2026, which was issued for the corresponding Korean Patent Application No. 10-2023-7029188, 19 pages, with English translation.

* cited by examiner

*Primary Examiner* — Robert C Boyle
(74) *Attorney, Agent, or Firm* — LUCAS & MERCANTI, LLP

(57) ABSTRACT

A curable composition includes: a component (A) that is a polysiloxazane compound having a weight-average molecular weight of 3,000 to 10,000 and a number-average molecular weight of 2,000 to 8,000, and having a specific structure; and (B) a silicone compound having a hydrolysable silyl group or a hydroxy group. According to the present invention, a curable composition that can form a coating having excellent water repellency and sliding property, and that also has excellent coating stability in the initial working is provided.

20 Claims, 1 Drawing Sheet

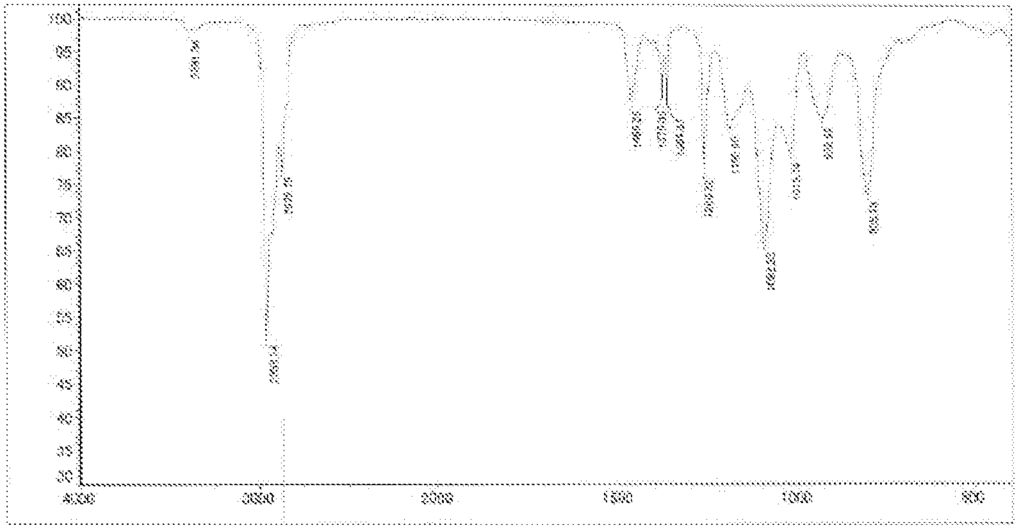

CURABLE COMPOSITION, AND CURED COATING, ARTICLE, AND METHOD FOR FORMING COATING USING THE SAME

CROSS REFERENCE TO RELATED APPLICATION

This Application is a 371 of PCT/JP2022/009959 filed on Mar. 8, 2022, which claimed priority of Japanese Application No. 2021-043634 filed on Mar. 17, 2021, both of which are incorporated herein by reference.

TECHNICAL FIELD

The present invention relates to a curable composition that can form a cured coating having excellent water repellency and sliding property, and a cured coating, article, and method for forming a coating using the same.

BACKGROUND ART

Curable compositions have been conventionally applied onto and worked on a coated steel sheet of an automobile body for the purpose of protection and improvement of beauty appearance. For example, Japanese Patent Laid-Open No. 2014-139301 discloses a curable composition containing a polysilazane compound as a main component and having excellent water repellency and sliding property.

SUMMARY OF INVENTION

However, it has been difficult to satisfy all of coating stability in initial working (stability of a contact angle of the coating in the initial working), sufficient water repellency (that is, a sufficiently large contact angle of waterdrop), and a sliding property (that is, a sufficiently small sliding angle of waterdrop) with a good balance even with the curable composition described in Japanese Patent Laid-Open No. 2014-139301.

The present invention has been made in view of the above circumstances, and an object of the present invention is to provide a curable composition that can form a coating having excellent water repellency and sliding property and that also has excellent coating stability in the initial working. In addition, another object of the present invention is to provide a cured coating, article, and method for forming a coating using the above curable composition.

As a result of intensive studies to achieve the above objects, the present inventor has found that a curable composition described in detail later can form a coating having excellent water repellency and sliding property and also having excellent coating stability in the initial working, and has completed the present invention.

The gist of the present invention will be described hereinafter.

1. A curable composition including: a component (A) that is a polysiloxazane compound having a weight-average molecular weight of 3,000 to 10,000 and a number-average molecular weight of 2,000 to 8,000; and a component (B) that is a silicone compound having a hydrolysable silyl group or a hydroxy group, wherein the component (A) contains constituent units a to d represented by the formula (1), and a mole ratio between each of the constituent units a:b:c:d is 5 to 15:1 to 3:6 to 10:0.5 to 1.5:

(1)

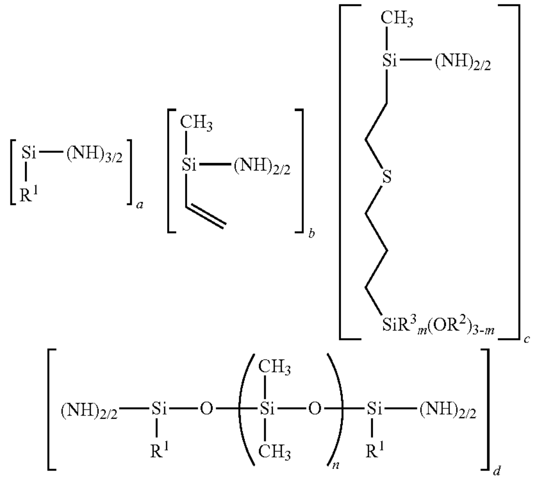

(In the formula (1), $R^1$ represents an unsubstituted monovalent alkyl group having 3 to 10 carbon atoms, and $R^2$ and $R^3$ each independently represent an unsubstituted monovalent alkyl group having 1 to 6 carbon atoms; and m is 0 or 1, and n is an integer of 30 to 100).

2. The curable composition according to 1., wherein m in the component (A) is 0.
3. The curable composition according to 1. or 2., wherein $R^1$ in the component (A) is an unsubstituted monovalent alkyl group having 4 to 8 carbon atoms.
4. The curable composition according to any of 1. to 3., wherein the component (B) has a kinematic viscosity at 25° C. of 1 to 500 $mm^2/s$.
5. The curable composition according to any of 1. to 4., wherein the component (B) contains a silicone compound having, at a terminal, one or more functional groups selected from the group consisting of a dialkoxysilyl group, a trialkoxysilyl group, a silanol group, and a carbinol group.
6. The curable composition according to any of 1. to 5., wherein the component (B) is contained in an amount of 0.1 to 500 parts by mass relative to 100 parts by mass of the component (A).
7. The curable composition according to any of 1. to 6., further including a catalyst as a component (C).
8. The curable composition according to 7., wherein the component (C) contains one or more compounds selected from the group consisting of an organotin compound, an organotitanium compound, an organoaluminum compound, an aluminum salt compound, an organozinc compound, an organozirconium compound, an inorganic acid compound, an organic acid compound, an inorganic base compound, and an organic base compound.
9. The curable composition according to any of 1. to 8., further including an organic solvent as a component (D).
10. The curable composition according to 9., wherein the component (D) is an aromatic hydrocarbon solvent or an aliphatic hydrocarbon solvent.
11. The curable composition according to 9. or 10., wherein the component (D) is contained in an amount of 200 to 15,000 parts by mass relative to 100 parts by mass of the component (A).

12. The curable composition according to any of 1. to 11., wherein the curable composition is used for forming a coating on a surface of a substrate selected from a metal, a glass, a ceramic, a plastic, a fiber, a steel sheet, and an exterior steel sheet.
13. A cured coating obtained by curing the curable composition set forth in any of 1. to 12.
14. An article including the cured coating set forth in 13., wherein the article is selected from the group consisting of an automobile, a motorcycle, a bicycle, a railway vehicle, a solar panel, a vending machine, and a building.
15. A method for forming a coating, including applying the curable composition set forth in any of 1. to 11. onto a substrate surface, and curing the curable composition on the substrate.

BRIEF DESCRIPTION OF DRAWING

FIG. 1 is an IR spectrum of a polysiloxazane 1 used in Example.

DESCRIPTION OF EMBODIMENTS

Hereinafter, the present invention will be described in detail. The present disclosure is not limited only to the following embodiments. The term “X to Y” used herein has the meaning of including numerical values described before and after the term (X and Y) as the lower limit and the upper limit, respectively, and means “X or more and Y or less”. The concentration and % respectively represent a mass concentration and % by mass, unless otherwise mentioned, and a ratio means a mass ratio unless otherwise mentioned. Unless otherwise specifically described, procedures and measurements of physical properties and the like are performed under a condition at a room temperature (20 to 25° C.)/a relative humidity of 40 to 55% RH. The term “A and/or B” means to include each of A and B, and a combination thereof.

[Curable Composition]

A curable composition according to an aspect of the present invention (hereinafter, also referred to as “curable composition” or simply “composition”) includes a component (A) that is a polysiloxazane compound having a weight-average molecular weight of 3,000 to 10,000 and a number-average molecular weight of 2,000 to 8,000, and a component (B) that is a silicone compound having a hydrolysable silyl group or a hydroxy group, wherein the component (A) contains constituent units a to d represented by the formula (1), and a mole ratio between each of the constituent units a:b:c:d is 5 to 15:1 to 3:6 to 10:0.5 to 1.5.

(1)

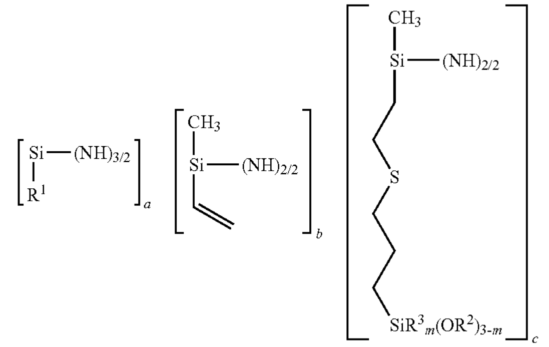

-continued

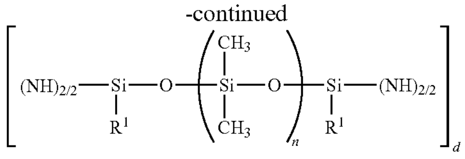

(In the formula (1), $R^1$ represents an unsubstituted monovalent alkyl group having 3 to 10 carbon atoms, $R^2$ and $R^3$ each independently represent an unsubstituted monovalent alkyl group having 1 to 6 carbon atoms. m is 0 or 1, and n is an integer of 30 to 100.)

That is, the curable composition includes the component (A) and the component (B), which will be described in detail hereinafter. By including these components, the curable composition according to the present invention can form a coating having excellent water repellency and sliding property, and also having excellent coating stability in initial working.

Hereinafter, each component contained in the curable composition will be described.

<Component (A)>

The component (A) contained in the curable composition of the present invention is a polysiloxazane compound having a weight-average molecular weight of 3,000 to 10,000 and a number-average molecular weight of 2,000 to 8,000, and containing constituent units a to d represented by the following formula (1), wherein a mole ratio between each of the constituent units a:b:c:d is 5 to 15:1 to 3:6 to 10:0.5 to 1.5.

As shown in the following formula (1) (average composition formula (1)), the component (A) is a polysiloxazane compound having the constituent units represented by the average composition formulae with each of subscripts a to d. Forming a coating film containing the polysiloxazane compound on an adherend, such as a substrate, can impart the water repellency, the sliding property, and the like to the surface of the adherend.

The term “polysiloxazane compound” herein means a compound having both of a Si—N bond and a Si—O bond. It is commonly known that this compound is hydrolytically reacted due to moisture present in air, a nitrogen atom in the molecule is eliminated to generate ammonia, and the reaction is further promoted by this ammonia as a catalyst to form three-dimensional Si—O bonds. In general, a “polysilazane compound” refers to a compound having a plurality of Si—N bonds, but to distinguish them from the polysiloxazane compound, a “polysilazane compound” herein refers to a compound having Si—N bond but having no Si—O bond. In the formula (1), the constituent units with each of the cccs a to d (hereinafter, which may be simply referred to as “constituent unit a”, “constituent unit b”, “constituent unit c”, and “constituent unit d”, respectively) are bonded via a silazane bond (═Si—NH—Si═). That is, silicon atoms contained in each of the constituent units are bonded via the silazane bond. The constituent units a to d are described in this order in the following formula (1), but the order of bonding of each of the constituent units is not limited to this order, and the constituent unit(s) to be bonded is/are also not limited to the description of the formula (1). For example, not all the constituent unit a is necessarily bonded to the constituent unit b via the silazane bond, and may be bonded to any of the constituent units b to d via the above bond.

(1)

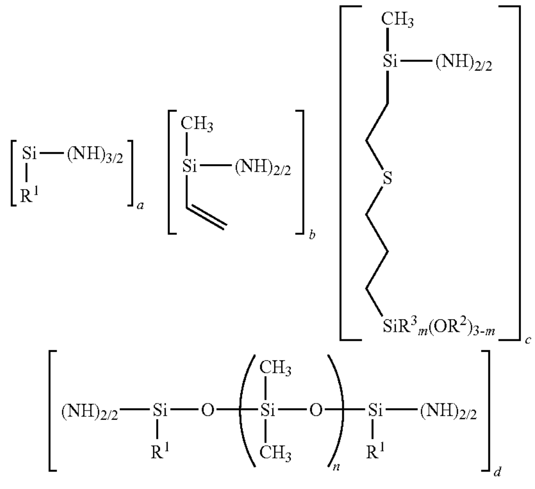

(In the formula (1), $R^1$ represents an unsubstituted monovalent alkyl group having 3 to 10 carbon atoms, $R^2$ and $R^3$ each independently represent an unsubstituted monovalent alkyl group having 1 to 6 carbon atoms. m is 0 or 1, and n is an integer of 30 to 100.)

Examples of $R^1$ of the unsubstituted monovalent alkyl group having 3 to 10 carbon atoms include a linear, branched, or cyclic alkyl group. Examples thereof include: a n-propyl group, a n-butyl group, a n-pentyl group, a n-hexyl group, a n-heptyl group, a n-octyl group, a n-nonyl group, a n-decyl group, an isopropyl group, an isobutyl group, a sec-butyl group, a tert-butyl group, an isoamyl group, a tert-pentyl group, a neopentyl group, a 3-methylpentan-2-yl group, a 3-methylpentan-3-yl group, a 4-methylpentyl group, a 4-methylpentan-2-yl group, a 1,3-dimethylbutyl group, a 3,3-dimethylbutyl group, a 3,3-dimethylbutan-2-yl group, a 1-methylhexyl group, a 3-methylhexyl group, a 4-methylhexyl group, a 5-methylhexyl group, a 1-ethylpentyl group, a 1-(n-propyl)butyl group, a 1,1-dimethylpentyl group, a 1,4-dimethylpentyl group, a 1,1-diethylpropyl group, a 1,3,3-trimethylbutyl group, and a 1-ethyl-2,2-dimethylpropyl group; a cyclopropyl group, a cyclobutyl group, a cyclopentyl group, a cyclohexyl group, and a cycloheptyl group.

In the formula (1), $R^1$ is preferably an unsubstituted monovalent alkyl group having 4 to 8 carbon atoms, more preferably an unsubstituted monovalent alkyl group having 5 to 7 carbon atoms, particularly preferably an unsubstituted linear or branched alkyl group having 5 to 7 carbon atoms, and most preferably an unsubstituted linear or branched alkyl group having 6 carbon atoms.

$R^2$ and $R^3$ may be the same or different from each other. Examples of the unsubstituted monovalent alkyl group having 1 to 6 carbon atoms as $R^2$ and $R^3$ include a linear, branched, or cyclic alkyl group (the number of carbon atoms of the branched or cyclic alkyl group is 3 to 6). Examples thereof include a methyl group, an ethyl group, a n-propyl group, a n-butyl group, a n-pentyl group, a n-hexyl group, an isopropyl group, an isobutyl group, and a cyclohexyl group. In addition, examples thereof also include alkyl groups having 3 to 6 carbon atoms among the specific examples exemplified for the aforementioned unsubstituted monovalent alkyl group having 3 to 10 carbon atoms.

In the formula (1), $R^2$ and $R^3$ are preferably an unsubstituted monovalent alkyl group having 1 to 3 carbon atoms, more preferably an unsubstituted monovalent alkyl group having 1 or 2 carbon atoms.

In view of excellent coating stability in the initial working, m in the formula (1) is particularly preferably 0. n is more preferably an integer of 33 to 80, particularly preferably an integer of 35 to 60, and most preferably an integer of 38 to 45.

In the formula (1) representing the component (A), a content ratio between each of the constituent units a to d (mole ratio between each of the constituent units a to d (a:b:c:d)) is 5 to 15:1 to 3:6 to 10:0.5 to 1.5. Here, the content rate of the constituent unit d is preferably 0.5. In this case, a mole ratio between each of the constituent units a to d (a:b:c:d) is, as the content rate of the constituent unit d being 0.5, preferably 5 to 15:1 to 3:6 to 10:0.5, and more preferably 7.5 to 12.5:1.5 to 2.5:7 to 9:0.5. That is, the mole ratio between each of the constituent units a to d (a:b:c:d) is preferably 10 to 30:2 to 6:12 to 20:1, and more preferably 15 to 25:3 to 5:14 to 18:1. The mole ratio within the above range can yield the curable composition that can form a coating having excellent water repellency and sliding property and that has excellent coating stability in the initial working.

Another preferable embodiment of the content ratio between each of the constituent units a to d (mole ratio between each of the constituent units a to d (a:b:c:d)) is 5 to 15:1 to 3:6 to 10:1, and more preferably 7 to 13:1 to 3:6 to 10:1. The mole ratio within the above range can yield the curable composition that can form a coating having excellent water repellency and sliding property and that has excellent coating stability in the initial working.

The content ratio between each of the constituent units a to d (mole ratio between each of the constituent units a to d (a:b:c:d)) can be measured by GC/MS. The content ratio can be regulated by setting amounts of added compounds to be raw materials of the component (A) within appropriate ranges.

The component (A) may further contain a constituent unit other than the aforementioned each of the constituent units a to d. However, the component (A) preferably consists of the constituent units a to d in view of yielding the curable composition that can form a coating having excellent water repellency and sliding property and that has excellent coating stability in the initial working.

The component (A) is the polysiloxazane compound having the constituent units a to d represented by the formula (1) at the specific ratio, and having a weight-average molecular weight of 3,000 to 10,000 and a number-average molecular weight of 2,000 to 8,000. The weight-average molecular weight of the polysiloxazane compound as the component (A) is more preferably 3,500 to 8,000, further preferably 4,000 to 7,000, and particularly preferably 4,500 to 6,000. The "weight-average molecular weight" herein refers to a weight-average molecular weight (Mw) in terms of polystyrene measured by gel permeation chromatography (GPC). The number-average molecular weight of the polysiloxazane compound as the component (A) is more preferably 2,100 to 7,000, further preferably 2,200 to 6,000, and particularly preferably 2,300 to 5,000. The "number-average molecular weight" herein refers to a number-average molecular weight (Mn) in terms of polystyrene measured by gel permeation chromatography (GPC). The weight-average molecular weight and/or the number-average molecular weight within the above ranges can yield the curable composition that can form a coating having excellent water repellency and sliding property and that has excellent coating stability in the initial working.

A polydispersity (Mw/Mn) of the polysiloxazane compound as the component (A) is preferably 1.10 to 5.00, more preferably 1.20 to 3.00, and particularly preferably 1.50 to 2.50. The polydispersity (Mw/Mn) is calculated by dividing weight-average molecular weight (Mw) by number-average molecular weight (Mn), measured by the above method.

Next, a method for producing the polysiloxazane compound having the constituent units a to d represented by the formula (1) (average composition formula (1)) (hereinafter, referred to as "polysiloxazane (1)") as the component (A) will be described. The alkoxysilyl-group-containing polysiloxazane compound in the present invention can be obtained by, for example, a producing method in which the starting material is an unsaturated-bond (ethylenically-unsaturated-bond)-containing polysiloxazane compound having each of the constituent units a, b', and d represented by the following formula (8) (average composition formula (8)) (hereinafter, referred to as "unsaturated-bond-containing polysiloxazane compound (8)"), and the like.

(8)

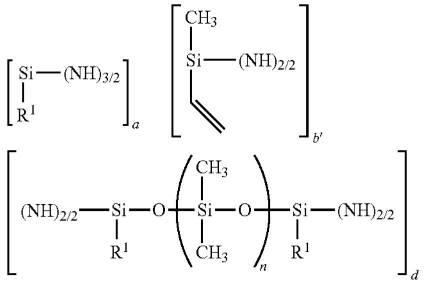

(In the formula (8), $R^1$ and n are the same as $R^1$ and n in the formula (1), respectively.)

In the formula (8), content ratio between each of the constituent units a, b', and d (mole ratio between each of the constituent units a, b', and d (a:b':d)) is preferably 5 to 15:1 to 16:0.5 to 1.5. Here, the content rate of the constituent unit d is preferably 0.5. In this case, the mole ratio between each of the constituent units a, b', and d (a:b':d) is, as the content rate of the constituent unit d being 0.5, preferably 5 to 15:7 to 13:0.5, and more preferably 7.5 to 12.5:8.5 to 11.5:0.5. That is, the mole ratio between each of the constituent units a, b', and d (a:b':d) is preferably 10 to 30:14 to 26:1, and more preferably 15 to 25:17 to 23:1.

Another preferable embodiment of the content ratio between each of the constituent units a, b', and d (mole ratio between each of the constituent units a, b', and d (a:b':d)) is 5 to 15:7 to 13:0.5 to 1.5, more preferably 5 to 15:7 to 13:1, and particularly preferably 7 to 13:7 to 13:1.

A weight-average molecular weight of these unsaturated-bond-containing polysiloxazanes (8) in terms of polystyrene by GPC is not particularly limited, and preferably 1,000 to 8,000.

First, a method for producing the unsaturated-bond-containing polysiloxazane compound (8) will be described. The unsaturated-bond-containing polysiloxazane compound (8) can be obtained by, for example, mixing an silicone oil OH-modified at both terminals represented by the following formula (4) (hereinafter, referred to as "silicone oil OH-modified at both terminals (4)") and a chlorosilane compound represented by the formula (5) (hereinafter, referred to as "chlorosilane compound (5)"), then adding a chlorosilane compound represented by the formula (7) (hereinafter, referred to as "chlorosilane compound (7)"), and introducing ammonia in to the mixture to perform an ammonolysis polymerization.

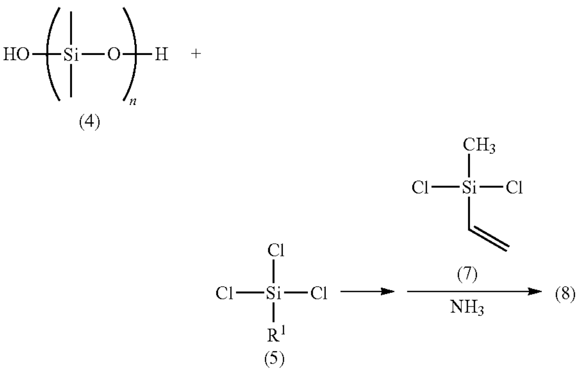

(In the reaction formula, $R^1$ and n are the same as $R^1$ and n in the formula (1), respectively.)

The silicone oil OH-modified at both terminals (4) has a kinematic viscosity at 25° C. of preferably 20 to 5,000 $mm^2/s$, more preferably 30 to 1,500 $mm^2/s$, and particularly preferably 50 to 100 $mm^2/s$. There is a correlation between the kinematic viscosity and n in the formula (4). Specifically, when the kinematic viscosity is 20 to 5,000 $mm^2/s$, $11 \leq n \leq 400$, and when the kinematic viscosity is 30 to 1,500 $mm^2/s$, $13 \leq n \leq 300$. The "kinematic viscosity" can be measured in accordance with JIS K2283:2000, and the value of the kinematic viscosity herein is a value measured with an Ubbelohde viscosimeter.

Specific examples of the chlorosilane compound (5) include n-propyltrichlorosilane, n-hexyltrichlorosilane, cyclohexyltrichlorosilane, n-octyltrichlorosilane, n-nonyltrichlorosilane, and n-decyltrichlorosilane.

A mixing ratio between the silicone oil OH-modified at both terminals (4) and the chlorosilane compound (5) is not particularly limited, and preferably 5 to 30 mol, more preferably 5 to 20 mol, still further preferably 7 to 15 mol, and particularly preferably 8 to 12 mol of the chlorosilane compound (5) relative to 1 mol of the mole amount of the OH groups in the silicone oil OH-modified at both terminals (4) in view of imparting a water sliding property to the obtained cured product. That is, an amount of the chlorosilane compound (5) added is preferably 10 to 60 mol, more preferably 10 to 40 mol, still further preferably 14 to 30 mol, and particularly preferably 16 to 24 mol, relative to 1 mol of the silicone oil OH-modified at both terminals (4).

Specific examples of the chlorosilane compound (7) include unsaturated-bond-containing alkyldichlorosilane compounds such as methylvinyldichlorosilane. An amount of the chlorosilane compound (7) added (used) is not particularly limited, and preferably 0.3 to 10 mol, more preferably 0.5 to 5 mol, still further preferably 0.8 to 3 mol, and particularly preferably 0.9 to 1.5 mol, relative to 1 mol of the chlorosilane compound (5).

The ammonolysis polymerization proceeds even without a solvent, but a solvent is preferably used because ammonium chloride is generated as a byproduct with the reaction proceeding and stirring becomes difficult. Examples of the solvent include: hydrocarbon solvents such as pentane, hexane, cyclohexane, isooctane, benzene, toluene, and xylene; and ether solvents such as diethyl ether, tetrahydrofuran, 4-methyltetrahydropyran, cyclopentyl methyl ether, dioxane, and dipropylene glycol dimethyl ether. These solvents can be used singly, or two or more thereof may be mixed to use. If any solvent remains after the synthesis of the component (A), the solvent shall be treated as a component (D), described later.

A reaction time of the ammonolysis polymerization can also be shortened by adding a catalyst. Specific examples of the catalyst include Bronsted acids such as methanesulfonic acid, benzenesulfonic acid, dodecylbenzenesulfonic acid, trifluoromethanesulfonic acid, acetic acid, propionic acid, benzoic acid, and trifluoroacetic acid. An amount of the catalyst added is not particularly limited, and preferably 0.001 to 0.1 mol, and more preferably 0.005 to 0.1 mol, relative to 1 mol of the chlorosilane compound (5) from the viewpoint of the effect of adding the catalyst or inhibition of side reactions.

The reaction temperature is not particularly limited, and preferably −85 to 100° C., more preferably −78 to 50° C., and still further preferably −10 to 20° C. from the viewpoint of sublimation of ammonium chloride or the reaction rate. The reaction time is preferably 30 minutes to 24 hours, and more preferably 3 hours to 15 hours from the viewpoint of the reaction rate or inhibition of side reactions. An atmosphere for the reaction is not particularly limited, and an inert gas atmosphere such as nitrogen and argon is preferable to avoid hydrolysis of the raw material.

The unsaturated-bond-containing polysiloxazane compound (8) can be collected from the reaction liquid after the reaction is completed by removing the ammonium chloride generated as a byproduct and removing the solvent if necessary. As a method for removing ammonium chloride, a filtering method is preferable.

Then, the polysiloxazane compound (1) is produced from the unsaturated-bond-containing polysiloxazane compound (8) obtained as above. As the producing method, there is a method in which a mercapto-group-containing silane compound represented by the following formula (9) (hereinafter, referred to as "mercapto-group-containing silane compound (9)") is subjected to an addition reaction in the presence of a radical generator.

Described is a method for producing the polysiloxazane compound (1) by introducing an alkoxysilyl group into the unsaturated-bond-containing polysiloxazane compound (8) by addition reaction of the mercapto-group-containing silane compound (9) in the present of a radical generator.

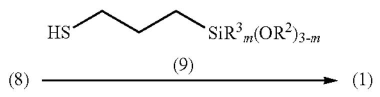

(In the reaction formula, $R^2$, $R^3$ and m are the same as $R^2$, $R^3$ and m in the formula (1), respectively.)

Specific examples of the mercapto-group-containing silane compound (9) include: mercaptoalkyltrialkoxysilane compounds such as mercaptopropyltrimethoxysilane; and mercaptoalkylalkyldialkoxysilane compounds such as mercaptopropylmethyldimethoxysilane.

As noted above, a radical generator is used for the addition reaction between the unsaturated-bond-containing polysiloxazane compound (8) and the mercapto-group-containing silane compound (9). Specific examples of this radical generator include: organic peroxides such as tert-butyl hydroperoxide, di-tert-butyl peroxide, and benzoyl peroxide; and azo compounds such as azobisisobutyronitrile and 2,2'-azobis(2-methylbutyronitrile), and azo compounds are particularly preferable. An amount of the radical generator used is not particularly limited, and preferably 0.00001 to 0.2 mol, more preferably 0.0001 to 0.1 mol, and particularly preferably 0.001 to 0.01 mol, relative to 1 mol of the unsaturated bonds contained in the unsaturated-bond-containing polysiloxazane compound (8) from the viewpoint of productivity.

A blending ratio between the unsaturated-bond-containing polysiloxazane compound (8) and the mercapto-group containing silane compound (9) is not particularly limited, and preferably 0.1 to 1.5 mol, more preferably 0.15 to 1.2 mol, still further preferably 0.2 to 1.0 mol, and particularly preferably 0.3 to 0.9 mol of the mercapto-group-containing silane compound (9) relative to 1 mol of the unsaturated bonds contained in the unsaturated-bond-containing organic polysiloxazane compound (8) from the viewpoint of usefulness of the product and the reactivity.

A reaction temperature of the addition reaction is not particularly limited, and preferably 0 to 200° C., and more preferably 20 to 150° C. in view of avoiding undesired side reactions. The reaction time is also not particularly limited, and preferably 1 to 40 hours, and more preferably 1 to 20 hours in view of avoiding undesired side reactions. The addition reaction is preferably performed under an inert gas atmosphere such as nitrogen and argon for preventing hydrolysis of the mercapto-group-containing silane compound (9).

Although the addition reaction proceeds without a solvent, the solvent may be used. Specific examples of the solvent include: aliphatic hydrocarbon solvents having 5 to 20 carbon atoms such as pentane, hexane, cyclohexane, heptane, octane, nonane, decane, isooctane, and isododecane; aromatic hydrocarbon solvents having 6 to 10 carbon atoms such as benzene, toluene, and xylene; ether solvents such as diethyl ether, tetrahydrofuran, dioxane, and dipropylene glycol dimethyl ether; ester solvents such as ethyl acetate and butyl acetate; aprotic polar solvents such as acetonitrile, N, N-dimethylformamide, and N-methylpyrrolidone; and silicone-based solvents such as hexamethyldisiloxane, octamethyltrisiloxane, decamethyltetrasiloxane, tris(trimethylsiloxy)methylsilane, octamethylcyclotetrasiloxane, and decamethylcyclopentasiloxane. These solvents may be used singly, or two or more thereof may be mixed to use. In particular, when the azo compound is used as the catalyst, toluene and xylene are preferable in terms of solubility of the catalyst.

As above, the other aspect of the present invention provides a method for producing a curable composition, the method including: adding a silicone oil OH-modified at both terminals represented by the formula (4) and a chlorosilane compound represented by the formula (5) at a mole ratio (silicone oil OH-modified at both terminals (4):the chlorosilane compound (5)) of 1:10 to 60; further adding a chlorosilane compound represented by the formula (7) at 0.3 to 10 mol relative to 1 mol of the chlorosilane compound (5) and introducing ammonia to perform an ammonolysis polymerization to obtain an unsaturated-bond-containing polysiloxazane compound represented by the formula (8); and adding a mercapto-group-containing silane compound represented by the formula (9) at 0.1 to 1.5 mol relative to 1 mol of the unsaturated-bond-containing polysiloxazane compound (8) to be reacted with the unsaturated-bond-containing polysiloxazane compound (8) in the presence of a radical generator, in this order to prepare a polysiloxazane compound (component (A)) having a weight-average molecular weight of 3,000 to 10,000 and a number-average molecular weight of 2,000 to 8,000; and adding a silicone compound (component (B)) having a hydrolysable silyl group or a hydroxy group.

As a preferable condition for the above producing method, the above description in the section <Component (A)> is referred to. Similarly, as a preferable embodiment of the component (B) and the like, the following description in the section <Component (B)> is referred to.

<Component (B)>

The component (B) contained in the curable composition of the present invention is a silicone compound having a hydrolysable silyl group or a hydroxy group (—OH). The component (B) of the present invention combined with the component (A) can yield the curable composition that can form the coating having excellent water repellency and sliding property and that has excellent coating stability in the initial working.

Here, the "hydrolysable silyl group" refers to a group in which one to three hydrolysable groups are bonded to a silicon atom. Preferable examples of the hydrolysable group include a halogen atom (a fluorine atom, a chlorine atom, a bromine atom, and an iodine atom), an alkoxy group, an acyloxide group, a ketoxymate group, and an alkenyloxide group. From the viewpoint of good compatibility with the component (A) and good coating stability in the initial working, the hydrolysable group is particularly preferably an alkoxy group. Hereinafter, a hydrolysable silyl group having an alkoxy group will also be referred to as "alkoxysilyl group". That is, the component (B) preferably has an alkoxysilyl group as the hydrolysable silyl group.

Examples of the alkoxysilyl group contained in the component (B) include a monoalkoxysilyl group, a dialkoxysilyl group, and a trialkoxysilyl group. The alkoxysilyl group is preferably a dialkoxysilyl group and a trialkoxysilyl group, and particularly preferably a trialkoxysilyl group in terms of excellent coating stability in the initial working.

The alkoxy group contained in the alkoxysilyl group is preferably an alkoxy group having 1 to 20 carbon atoms. The alkoxy group may be any of a linear or branched group, and is preferably a linear alkoxy group having 1 to 20 carbon atoms or a branched alkoxy group having 3 to 20 carbon atoms. Examples thereof include a methoxy group, an ethoxy group, a propoxy group, an isopropoxy group, a butoxy group, a pentyloxy group, a hexyloxy group, a heptyloxy group, an octyloxy group, a nonyloxy group, a decyloxy group, an undecyloxy group, a dodecyloxy group, a tridecyloxy group, a tetradecyloxy group, a pentadecyloxy group, a hexadecyloxy group, a heptadecyloxy group, an octadecyloxy group, a 2-ethylhexyloxy group, and a 3-ethylpentyloxy group. Among them, a linear alkoxy group having 1 to 5 carbon atoms or a branched alkoxy group having 3 to 5 carbon atoms is preferable, and a linear alkoxy group having 1 to 3 carbon atoms is more preferable.

Accordingly, examples of preferable monoalkoxysilyl groups include a dimethylmethoxysilyl group, a dimethylethoxysilyl group, and a dimethylpropoxysilyl group. Examples of preferable dialkoxysilyl groups include a methyldimethoxysilyl group, a methyldiethoxysilyl group, and a methyldipropoxysilyl group. Examples of preferable trialkoxysilyl groups include a trimethoxysilyl group, a triethoxysilyl group, and a tripropoxysilyl group. Among them, an alkoxysilyl group having a methoxy group is preferable, and a trimethoxysilyl group is particularly preferable from the viewpoint of high reactivity and capability of easily forming a coating.

The hydroxy group (—OH) contained in the component (B) may be directly bonded to a silicon atom or bonded to a silicon atom via an organic group. That is, the hydroxy group contained in the component (B) may be contained in a form of a silanol group, or may be contained in a form of a carbinol group. The "carbinol group" herein means a group having a hydroxy group linked with an organic group.

The silicone compound as the component (B) may be any as long as it has any one of the hydrolysable silyl group or the hydroxy group, and may contain both of them. A position of the hydrolysable silyl group or the hydroxy group in a molecular chain of the component (B) is not particularly limited to a terminal, a side chain, and the like, but preferably a terminal. The component (B) is particularly preferably a silicone compound having the hydrolysable silyl group or the hydroxy group at one terminal or both terminals, and most preferably a silicone compound having the hydrolysable silyl group or the hydroxy group at both terminals.

From the viewpoint of capability of yielding the curable composition having excellent coating stability in the initial working, the component (B) is preferably a silicone compound having a hydroxy group. That is, the component (B) is preferably a silicone compound having the silanol group and/or the carbinol group from the viewpoint of the coating stability in the initial working. From the same viewpoint, the component (B) is preferably a silicone compound having a silanol group and/or a carbinol group represented by the formula (11) or the formula (12), described later in detail. The carbinol group is preferably present at one terminal or both terminals of the silicone compound, and most preferably present at both terminals.

In view of excellent coating stability in the initial working, the component (B) is preferably a silicone compound having carbinol group(s) represented by the following formula (11) at one terminal or both terminals. In view of improving water repellency and sliding property, the component (B) is preferably a silicone compound having carbinol group(s) represented by the following formula (12) at one terminal or both terminals. In particular, the carbinol group represented by the following formula (12) contained in the component (B) is preferably present on both terminals because the sliding property can be improved.

As noted above, in view of improving coating stability in the initial working, the hydrolysable silyl group contained in the silicone compound as the component (B) is preferably a dialkoxysilyl group and a trialkoxysilyl group. Therefore, for the purpose of obtaining excellent coating stability in the initial working, the component (B) in the present invention is preferably a silicone compound having, at a terminal, one or more functional groups selected from the group consisting of a dialkoxysilyl group, a trialkoxysilyl group, a silanol group, and a carbinol group.

The component (B) has a kinematic viscosity at 25° C. of preferably 1 to 500 $mm^2/s$, more preferably 5 to 400 $mm^2/s$, further more preferably 10 to 200 $mm^2/s$, particularly preferably 10 to 60 $mm^2/s$, and most preferably 30 to 45 $mm^2/s$. The kinematic viscosity of the component (B) within the above range can yield the curable composition that can form a coating having excellent water repellency and sliding property and that has excellent coating stability in the initial working.

The component (B) is not particularly limited as long as it is a silicone compound having a hydrolysable silyl group or a hydroxy group together with a silicone skeleton. Examples of such a component (B) include a linear silicone compound as represented by the formula (10) and a silicone compound (silicone oligomer) having a structure (a branched structure or a mesh structure) in which silicon atoms are two-dimensionally or three-dimensionally bonded via oxygen atoms. The "silicone oligomer" herein refers to a silicone compound obtained by dealcoholization condensation (which is referred to as "partially hydrolyzing condensation" herein) by partial hydrolysis of a trifunctional alkoxysilyl compound and the like with an acid, a base, or a known catalyst such as an organotin compound and organotitanium compound. The “silicone compound” and the “silicone oligomer” are commonly used terms with almost no distinction, but herein, the silicone compound having the branched structure and/or the mesh structure may be referred to as “silicone oligomer” in order to make distinction from the linear silicone compound represented by, for example, the formula (10). The term “silicone compound” herein is used with intention including not only the linear silicone compound but also the silicone oligomer. The “oligomer” herein refers to a polymer having two or more repeated monomer units, and an upper limit of the number of the monomer units is preferably 100 or less.

(10)

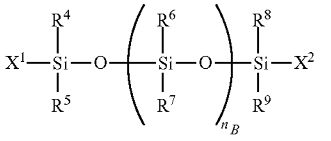

(In the formula (10), $R^4$ to $R^9$ each independently represent an alkyl group having 1 to 20 carbon atoms, a cycloalkyl group having 3 to 20 carbon atoms, an aryl group having 6 to 20 carbon atoms, an alkoxy group having 1 to 20 carbon atoms, or a halogen atom; $X^1$ and $X^2$ each independently represent an alkyl group having 1 to 20 carbon atoms, a cycloalkyl group having 3 to 20 carbon atoms, an aryl group having 6 to 20 carbon atoms, an alkoxy group having 1 to 20 carbon atoms, a hydroxy group, a carbinol group, or a halogen atom, and at least one of $X^1$ and $X^2$ is an alkoxy group, a hydroxy group, or a carbinol group; and $n_B$ is 5 to 850.)

In the formula (10), $R^4$ to $R^9$ may be the same as or different from each other. $R^4$ to $R^9$ are each independently preferably an alkyl group having 1 to 20 carbon atoms or an alkoxy group having 1 to 20 carbon atoms, more preferably an alkyl group having 1 to 5 carbon atoms or an alkoxy group having 1 to 5 carbon atoms, and particularly preferably an alkyl group having 1 to 5 carbon atoms.

In the formula (10), $X^1$ and $X^2$ may be the same as or different from each other. $X^1$ and $X^2$ are each independently preferably an alkyl group having 1 to 20 carbon atoms, an alkoxy group having 1 to 20 carbon atoms, a hydroxy group, or a carbinol group. In this case, at least one of $X^1$ and $X^2$ is an alkoxy group, a hydroxy group, or a carbinol group, and is more preferably an alkoxy group or a carbinol group.

Both $X^1$ and $X^2$ (both the terminals) are each independently more preferably an alkoxy group having 1 to 20 carbon atoms, a hydroxy group, or a carbinol group. In addition, in view of improving sliding property, $X^1$ and $X^2$ are each independently preferably an alkoxy group having 1 to 20 carbon atoms or a carbinol group, and more preferably a carbinol group. $X^1$ and $X^2$ are preferably same.

In the formula (10), ns represents the number of repeating units represented by the formula: $—Si(R^6)(R^7)—O—$, and is preferably 10 to 700.

The silicone compound represented by the formula (10) has a kinematic viscosity at 25° C. of preferably 1 to 500 $mm^2/s$, more preferably 5 to 400 $mm^2/s$, further more preferably 10 to 200 $mm^2/s$, particularly preferably 10 to 60 $mm^2/s$, and most preferably 30 to 45 $mm^2/s$.

An alkyl group having 1 to 20 carbon atoms in the formula (10) may be any of a liner or branched group, and is preferably a linear alkyl group having 1 to 20 carbon atoms or a branched alkyl group having 3 to 20 carbon atoms. Specific examples thereof include a methyl group, an ethyl group, a n-propyl group, an isopropyl group, a n-butyl group, an isobutyl group, a sec-butyl group, a tert-butyl group, a n-pentyl group, an isopentyl group, a tert-pentyl group, a neopentyl group, a 1,2-dimethylpropyl group, a n-hexyl group, an isohexyl group, a 1,3-dimethylbutyl group, a 1-isopropylpropyl group, a 1,2-dimethylbutyl group, a n-heptyl group, a 1,4-dimethylpentyl group, a 3-ethylpentyl group, a 2-methyl-1-isopropylpropyl group, a 1-ethyl-3-methylbutyl group, a n-octyl group, a 2-ethylhexyl group, a 3-methyl-1-isopropylbutyl group, a 2-methyl-1-isopropyl group, a 1-tert-butyl-2-methylpropyl group, a n-nonyl group, a 3,5,5-trimethylhexyl group, a n-decyl group, an isodecyl group, a n-undecyl group, a 1-methyldecyl group, a n-dodecyl group, a n-tridecyl group, a n-tetradecyl group, a n-pentadecyl group, a n-hexadecyl group, a n-heptadecyl group, a n-octadecyl group, a nonadecyl group, and an icosyl group. Among them, the alkyl group as $R^4$ to $R^9$ are each independently preferably a linear alkyl group having 1 to 5 carbon atoms or a branched alkyl group having 3 to 5 carbon atoms, and more preferably a linear alkyl group having 1 to 3 carbon atoms. The alkyl group as $X^1$ and $X^2$ is each independently preferably a linear alkyl group having 1 to 5 carbon atoms or a branched alkyl group having 3 to 5 carbon atoms, and more preferably a linear alkyl group having 1 to 3 carbon atoms.

Examples of a cycloalkyl group having 3 to 20 carbon atoms in the formula (10) include a cyclopropyl group, a cyclobutyl group, a cyclopentyl group, and a cyclohexyl group.

Examples of an aryl group having 6 to 20 carbon atoms in the formula (10) include a phenyl group, a naphthyl group, a biphenyl group, a fluorenyl group, an anthryl group, a pyrenyl group, an azulenyl group, an acenaphthylenyl group, and a terphenyl group.

Specific examples of an alkoxy group having 1 to 20 carbon atoms in the formula (10) include groups the same as the specific examples of the alkoxy group contained in the above alkoxysilyl group. Among them, the alkoxy group as $X^1$ and $X^2$ is each independently preferably a linear alkoxy group having 1 to 5 carbon atoms or a branched alkoxy group having 3 to 5 carbon atoms, and more preferably a linear alkoxy group having 1 to 3 carbon atoms. The alkoxy group as $R^4$ to $R^9$ is each independently preferably a linear alkoxy group having 1 to 5 carbon atoms or a branched alkoxy group having 3 to 5 carbon atoms, and more preferably a linear alkoxy group having 1 to 3 carbon atoms.

Examples of a halogen atom in the formula (10) include a fluorine atom, a chlorine atom, a bromine atom, and an iodine atom.

Examples of a carbinol group in the formula (10) include an organic group represented by $—CH_2—OH$ or an organic group having a $—CH_2—OH$ structure in a part thereof. Examples of an organic group having a $—CH_2—OH$ structure in a part thereof include organic groups represented by the following formula (11) and the formula (12). Therefore, a preferable embodiment is an embodiment in which at least one of $X^1$ and $X^2$ in the formula (10) is a carbinol group represented by the following formula (11) or formula (12). The silicone compound represented by the formula (10) may have these substituents singly, or may have a plurality of the substituents.

(11)

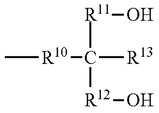

(In the formula (11), $R^{10}$, $R^{11}$, and $R^{12}$ each independently represent an alkylene group having 1 to 20 carbon atoms or an oxyalkylene group having 1 to 20 carbon atoms; and $R^{13}$ represents an alkyl group having 1 to 20 carbon atoms.)

$R^{10}$, $R^{11}$, and $R^{12}$ may be the same as or different from each other. An alkylene group having 1 to 20 carbon atoms as $R^{10}$, $R^{11}$, and $R^{12}$ may be any of a linear or branched group, and is preferably a linear alkylene group having 1 to 20 carbon atoms or a branched alkylene group having 3 to 20 carbon atoms. Specific examples thereof include a methylene group, an ethylene group, a trimethylene group, a tetramethylene group, a propylene group, an ethylethylene group, a pentamethylene group, a hexamethylene group, a heptamethylene group, and an octamethylene group. Among them, a linear alkylene group having 1 to 5 carbon atoms or a branched alkylene group having 3 to 5 carbon atoms is preferable, and a linear alkylene group having 1 to 3 carbon atoms is more preferable.

An oxyalkylene group having 1 to 20 carbon atoms may be any of a linear or branched group, and is preferably a linear oxyalkylene group having 1 to 20 carbon atoms or a branched oxyalkylene group having 3 to 20 carbon atoms. Specific examples thereof include an oxymethylene group ($—OCH_2—$), an oxyethylene group ($—OCH_2CH_2—$), an oxypropylene group ($—OCH(CH_3)CH_2—$), an oxytrimethylene group ($—OCH_2CH_2CH_2—$), and an oxybutylene group ($—OCH_2CH_2CH_2CH_2—$). Among them, a linear oxyalkylene group having 1 to 5 carbon atoms or a branched oxyalkylene group having 3 to 5 carbon atoms is preferable, and a linear oxyalkylene group having 1 to 3 carbon atoms is more preferable.

The above "oxyalkylene group" includes, in addition to the divalent substituent having the above structure (—O—(C1 to C20 alkylene unit)-), an alkyleneoxyalkylene group represented by the formula: —(C1 to C10 alkylene unit (1))—O—(C1 to C10 alkylene unit (2))- (that is, alkyleneoxyalkylene group having 2 to 20 carbon atoms). Here, the "C1 to C10 alkylene unit (1)" is bonded to the silicon atom in the formula (10) or the hydroxy group in the formula (11), and the "C1 to C10 alkylene unit (2)" is bonded to the carbon atom in the formula (11). The number of carbon atoms contained in the alkylene units (1) and (2) may be the same as or different from each other, and is preferably different.

Specific examples of alkylene units (1) and (2) include groups the same as specific examples having 10 or less carbon atoms among the specific examples of the alkylene group having 1 to 20 carbon atoms as the $R^{10}$ and the like. Among them, a linear alkylene group having 1 to 5 carbon atoms or a branched alkylene group having 3 to 5 carbon atoms is preferable, and the alkylene units (1) and (2) are more preferably a linear alkylene group having 1 to 4 carbon atoms.

Specific examples of an alkyl group having 1 to 20 carbon atoms as $R^{13}$ include groups the same as specific examples of the alkyl group having 1 to 20 carbon atoms in the formula (10) and the like. Among them, a linear alkyl group having 1 to 5 carbon atoms or a branched alkyl group having 3 to 5 carbon atoms is preferable, and a linear alkyl group having 1 to 3 carbon atoms is more preferable.

Among the above structures, $R^{10}$ is preferably an alkyleneoxyalkylene group having 2 to 20 carbon atoms, $R^{11}$ and $R^{12}$ are each independently preferably a linear alkylene group having 1 to 5 carbon atoms or a branched alkylene group having 3 to 5 carbon atoms, and $R^{13}$ is preferably a linear alkyl group having 1 to 5 carbon atoms or a branched alkyl group having 3 to 5 carbon atoms. Furthermore, $R^{10}$ is more preferably an alkyleneoxyalkylene group represented by the formula: -(linear alkylene group having 1 to 4 carbon atoms)-O-(linear alkylene group having 1 to 4 carbon atoms)-, $R^{11}$ and $R^{12}$ are each independently more preferably a linear alkylene group having 1 to 3 carbon atoms, and $R^{13}$ is more preferably a linear alkyl group having 1 to 3 carbon atoms.

$$—R^{14}—O—R^{15}—OH \quad (12)$$

(In the formula (12), $R^{14}$ and $R^{15}$ each independently represent an alkylene group having 1 to 10 carbon atoms.)

$R^{14}$ and $R^{15}$ may be the same as or different from each other. Specific examples of an alkylene group having 1 to 10 carbon atoms as $R^{14}$ and $R^{15}$ include groups the same as the specific examples of the alkylene group having 1 to 10 carbon atoms in the formula (11). Among them, a linear alkylene group having 1 to 8 carbon atoms or a branched alkylene group having 3 to 5 carbon atoms is preferable, and a linear alkylene group having 1 to 5 carbon atoms is more preferable.

In view of excellent coating stability in the initial working, at least one of $X^1$ and $X^2$ in the formula (10) is preferably a carbinol group represented by the formula (11). In view of improving water repellency and sliding property, at least one of $X^1$ and $X^2$ in the formula (10) is preferably a carbinol group represented by the formula (12). In particular, for the reason that the sliding property can be improved, it is preferred that in the formula (10), both $X^1$ and $X^2$ are carbinol group represented by the formula (12).

$R^{10}$ in the formula (11) and $R^{14}$ in the formula (12) are each bonded to the silicon atoms in the formula (10).

Commercial products of the component (B) in the present invention are not limited. Examples of a silicone compound having an alkoxy group represented by the formula (10) include X-40-2090 (manufactured by Shin-Etsu Chemical Co., Ltd.), and examples of a silicone oligomer having an alkoxy group include KR-500 (manufactured by Shin-Etsu Chemical Co., Ltd.). Examples of a silicone compound having a hydroxy group include KF-9701 (manufactured by Shin-Etsu Chemical Co., Ltd.) and XC-96-C7123 (manufactured by Momentive Performance Materials Japan LLC). Examples of a silicone compound having a carbinol group include X-22-160AS, X-22-170BX, and X-22-176DX (manufactured by Shin-Etsu Chemical Co., Ltd.). These may be used singly, or may be used in combinations of a plurality thereof. When two or more thereof are used in combination, the content of the component (B) refers to the total amount.

The content of the component (B) (when two or more types of the component (B) are used, the total amount thereof) in the curable composition according to the present invention is preferably within a range of 0.1 to 500 parts by mass, more preferably within a range of 0.5 to 400 parts by mass, particularly preferably within a range of 1 to 300 parts by mass, and most desirably within a range of 30 to 80 parts by mass, relative to 100 parts by mass of the component (A). The content of the component (B) within the above range can yield the curable composition that can form a coating having excellent water repellency and sliding property and that has excellent coating stability in the initial working.

<Component (C)>

The curable composition of the present invention preferably further includes a catalyst as a component (C). The curable composition containing the component (C) enables moisture in air and the like to be reacted with the hydrolysable functional group contained in the component (A) or the component (B) to promote the condensation reaction. Therefore, the curable composition further containing the component (C) can promote the formation of a cured coating.

Examples of a component (C) include an organotin compound, an organotitanium compound, an organoaluminum compound, an organozinc compound, an organozirconium compound, an inorganic acid compound, an organic acid compound, an inorganic base compound, and an organic base compound. That is, the component (C) preferably contains one or more compounds selected from the group consisting of an organotin compound, an organotitanium compound, an organoaluminum compound, an aluminum salt compound, an organozinc compound, an organozirconium compound, an inorganic acid compound, an organic acid compound, an inorganic base compound, and an organic base compound. Among them, in terms of good compatibility with the component (A) and the component (B) in the present invention and capability of yielding the curable composition that can form a coating having excellent water repellency and sliding property and that has excellent coating stability in the initial working, an organotitanium compound, an organoaluminum compound, an inorganic acid compound, and an organic base compound are preferable, an organotitanium compound and an organoaluminum compound are particularly preferable, and an organotitanium compound is most preferable. These may be used singly, or may be used in combinations of a plurality thereof.

Examples of an organotin compound include dibutyltin dilaurate, dibutyltin dioctate, dibutyltin diacetate, dioctyltin dilaurate, dioctyltin dioctate, dioctyltin diacetate, dibutyltin bisacetylacetate, and dioctyltin bisacetyllaurate. Examples of an organotitanium compound include: titanium chelate compounds such as titanium acetylacetonato, titanium-1,3-propanedioxybis(ethylacetoacetate), and titanium ethylacetoacetate; and titanium alkoxide compounds such as tertiaryamyl titanate, tetratertiarybutyl titanate, titanium-1,3-propanedioxybis(ethylacetoacetate), tetrastearyl titanate, tetraoctyl titanate, tetranormalbutyl titanate, and tetraisopropyl titanate. Examples of an organoaluminum compound include: aluminum chelate compounds such as aluminum methoxy bis(ethylacetoacetate), aluminum methoxy bis(acetylacetonate), aluminum ethoxy bis(ethylacetoacetate), aluminum ethoxy bis(acetylacetonate), aluminum isopropoxy bis(ethylacetoacetate), aluminum isopropoxy bis(methylacetoacetate), aluminum isopropoxy bis(t-butylacetoacetate), aluminum butoxy bis(ethylacetoacetate), aluminum dimethoxy (ethylacetoacetate), aluminum dimethoxy (acetylacetonate), aluminum diethoxy (ethylacetoacetate), aluminum diethoxy (acetylacetonate), aluminum diisopropoxy (ethylacetoacetate), aluminum diisopropoxy (methylacetoacetate), aluminum tris(ethylacetoacetate), and aluminum tris(acetylacetonate); and aluminum alkoxide compounds such as aluminum trimethoxide, aluminum triethoxide, aluminum triallyloxide, and aluminum triphenoxide. Examples of an aluminum salt compounds include aluminum hydroxide and an aluminosiloxy compound (aluminosilicate). Examples of an organozinc compound include zinc octylate, zinc 2-ethylhexanoate, zinc triacetylacetonate, zinc 2-ethylhexoate, zinc naphtenate, and zinc stearate. Examples of an organozirconium compound include zirconium tetraacetylacetonate, zirconium tributoxy acetylacetonate, zirconium dibutoxy diacetylacetonate, zirconium tetranormalpropoxide, zirconium tetraisopropoxide, zirconium tetranormalbutoxide, zirconium acylate, zirconium tributoxy stearate, zirconium octoate, and zirconium (2-ethylhexoate).

Examples of an inorganic acid compound include hydrochloric acid, phosphoric acid, a sulfuric acid, and hydrofluoric acid. Examples of an organic acid compound include p-toluenesulfonic acid, oxalic acid, citric acid, and acetic acid. Example of an inorganic base compound include ammonia, sodium hydroxide, and magnesium hydroxide. Examples of an organic base compound include trimethylamine, triethylamine, tributylamine, 1,5-diazabicyclo[4.3.0]nonene-5 (DBN), and 1,8-diazabicyclo[5.4.0]undecene-7 (DBU).

These catalysts may be used singly, or may be used in combinations of a plurality thereof.

Examples of commercial products of an organotitanium compound include ORGATIX® TA-8, TA-21, TA-23, TA-30, TC-100, TC-401, and TC-710 (manufactured by Matsumoto Fine Chemical Co., Ltd.) and D-20, D-25, and DX-175 (manufactured by Shin-Etsu Chemical Co., Ltd.). Examples of commercial products of an organoaluminum compound include DX-9740 and CAT-AC (manufactured by Shin-Etsu Chemical Co., Ltd.). Examples of an inorganic acid compound include D-220 and X-40-2309A (manufactured by Shin-Etsu Chemical Co., Ltd.).

An amount of the component (C) added (content: when two or more types of the component (C) are used, the total amount thereof) in the curable composition according to the present invention is not particularly limited, and for example, preferably 0.01 to 50 parts by mass, more preferably 0.03 to 30 parts by mass, and particularly preferably 1 to 10 parts by mass, relative to 100 parts by mass of the component (A). The amount set within the above range can yield the curable composition that can form a coating having further excellent water repellency and sliding property and that has excellent coating stability in the initial working.

<Component (D)>

The curable composition of the present invention may further include an organic solvent as a component (D). The organic solvent means a material that can dissolve or uniformly disperse the component (A) and the component (B) contained in the curable composition.

The component (D) is not particularly limited, and examples thereof include: aromatic hydrocarbon solvents such as benzene, toluene, and xylene; aliphatic hydrocarbon solvents such as paraffin solvents, isoparaffin solvents, and cycloparaffin solvents; methanol and alcohol solvents having 2 or more carbon atoms such as ethanol, 1-propanol, 2-propanol, 1-butanol, 2-butanol, and tert-butanol; ketone solvents such as acetone and methyl ethyl ketone; acetate ester solvents such as methyl acetate, ethyl acetate, propyl acetate, isopropyl acetate, and butyl acetate; halogenated solvents such as dichloromethane, chloroform, tetrachloroethane, and chlorobenzene; ether solvents such as ethyl ether and THE; and gasoline. These may be used singly, or may be used in combination of a plurality thereof.

Examples of paraffin solvents include n-hexane and n-heptane, examples of isoparaffin solvent include isononane, isohexane, isooctane, and isododecane, and examples of cycloparaffin solvent include cyclohexane and methylcyclohexane.

These organic solvents may be used singly, or may be used in combinations of a plurality thereof.

In the present invention, from the viewpoint of capability of yielding the curable composition that can form a coating having excellent water repellency and sliding property and that has excellent coating stability in the initial working, an aromatic hydrocarbon solvent, an aliphatic hydrocarbon solvent, and the like are preferable, an aliphatic hydrocarbon solvent is further preferable, and isoparaffin solvent is particularly preferable.

Commercial products of an organic solvent as the component (D) are not particularly limited, and examples thereof include Exxsol D30 and D40 (manufactured by Tonen General Sekiyu K. K.), KYOWASOL® C-800, C-600M, and C-900 (manufactured by KH Neochem Co., Ltd.), Isoper E® (manufactured by MARUZEN CHEMICAL TRADING CO., LTD.), Naphthesol® 160, 200, and 220 (JXTG Nippon Oil & Energy Corporation), and IP Solvent 1620 (manufactured by Idemitsu Kosan Co., Ltd.).

An amount of the component (D) added (content: when two or more types of the component (D) are used, the total amount thereof) in the curable composition according to the present invention is preferably within a range of 200 to 15,000 parts by mass, more preferably within a range of 500 to 10,000 parts by mass, further preferably within a range of 800 to 9,000 parts by mass, particularly preferably within a range of 1,200 to 8,500 parts by mass, and most preferably 3,000 to 5,000 parts by mass, relative to 100 parts by mass of the component (A). The amount set within the above range enables the curable composition of the present invention to ensure good storage stability and operability, and have appropriate volatility. Among them, the amount of the component (D) added of within a range of 1,200 to 8,500 parts by mass relative to 100 parts by mass of the component (A) provides excellent workability of coating formation with keeping the coating characteristics.

<Optional Components>

The curable composition according to the present invention may further include any additional components within a range not impairing the characteristics. For example, components of an aging inhibitor, a rust preventing agent, an antifungal agent, a colorant, a surfactant, a rheology regulating agent, an ultraviolet absorbent, a fluorescent agent, a polishing agent, a perfume agent, a filler, and the like can be selected.

<Method for Producing Curable Composition>

The curable composition of the present invention can be produced by a conventionally known method. For example, predetermined amounts of the component (A), the component (B), and other optional components can be weighed and mixed by using a mixing means such as a mixer to obtain the curable composition according to the present invention. In this time, the mixing condition is not particularly limited, and the mixing temperature is preferably 10 to 70° C., more preferably 20 to 50° C., and particularly preferably a normal temperature (25° C.), and the mixing time is preferably 0.1 to 5 hours, more preferably 30 minutes to 3 hours, and particularly preferably about 60 minutes.

[Method for Forming Coating and Cured Coating]

A method for forming a coating of the curable composition of the present invention is not particularly limited, and examples thereof include the following method. First, a fiber such as a brash, a sponge, and a rag is impregnated with an appropriate amount of the curable composition of the present invention, and this is applied and spread onto a substrate surface by hand (applying step). Then, the component (A) and the component (B) are reacted to form a coating (cured coating) of the curable composition (reacting step). In this time, the curable composition further containing the component (C) promotes the above reaction by the component (C) to more efficiently form the coating of the curable composition.

That is, another aspect of the present invention provides a method for forming a coating including applying the above curable composition onto a substrate surface, and curing the curable composition on the substrate surface.

When the curable composition further contains the component (D), a fiber is impregnated with an appropriate amount of the curable composition of the present invention, this is applied and spread onto a substrate surface by hand, and then the component (D) is preferably volatilized by natural drying, drying using a dryer and the like (drying step). That is, the method for forming a coating according to another embodiment of the present invention preferably further incudes, after applying the curable composition containing the component (D) onto the substrate surface, drying an organic solvent as the component (D).

After the applying step, finishing may be performed by wiping the applied surface (wiping away an excess curable composition) using another dry cloth, microfiber rug, or the like (finishing step). That is, the method for forming a coating according to another embodiment of the present invention preferably further includes, after applying the curable composition onto the substrate surface, wiping the applied surface (wiping away an excess curable composition).

Furthermore, according to another aspect of the present invention, a cured coating obtained by curing the above curable composition is provided. The cured coating formed by using the curable composition has excellent water repellency and sliding property, and good coating stability in the initial working.

A thickness of the coating (cured coating) of the curable composition of the present invention is not particularly limited, and preferably 0.01 to 500 μm, more preferably within a range of 0.1 to 300 μm, and further preferably within a range of 0.5 to 100 μm. Setting the thickness of the coating of the curable composition within the above range can keep the good water repellency and sliding property. Therefore, in the applying step in the method for forming a coating according to the present invention, a thickness of the coating film is preferably appropriately regulated so that the thickness of the coating when dried is within the above range.

Examples of a substrate include metal, glass, ceramic, plastic, and fiber, and among them, metal, glass, plastic, and the like are preferable. Specific examples of metal include a bar-shaped, spherical, or plate-shaped metal member. Specifically, the metal may be a steel sheet (unpainted metal steel sheet) or an exterior steel sheet (painted steel sheet). The curable composition of the present invention is suitably used for forming a coating on a surface of a substrate selected from the group consisting of a metal, a glass, a ceramic, a plastic, a fiber, a steel sheet, and an exterior steel sheet. The curable composition of the present invention is more preferably used for forming a coating on a surface of a substrate selected from the group consisting of a plastic, a steel sheet, and an exterior steel sheet.

Examples of a plastic include a (meth)acryl resin, a polycarbonate, polybutylene terephthalate, polyphenylene sulfide, polyethylene terephthalate, polyethylene naphthalate, an acrylonitrile-butadiene-styrene resin, a styrene-methacryl resin, polystyrene, polyethylene, polypropylene, polyvinyl chloride, a polyester, and a polyurethane.

Among them, the curable composition of the present invention is preferable from the viewpoint of capability of forming a cured coating having excellent adhesiveness to a steel sheet (unpainted metal steel sheet), an exterior steel sheet (painted steel sheet), a (meth)acryl resin, a polycarbonate, polybutylene terephthalate, polyethylene terephthalate, polyphenylene sulfide, polyethylene, polypropylene, and a styrene-methacryl resin. The term "(meth)acryl" includes both of acryl and methacryl.

Use

Examples of major use of the curable composition of the present invention include: an antifouling coating agent for objects placed in an outdoor place in a long term such as an automobile, a motorcycle, a bicycle, a building machine, an agricultural machine, an aircraft, a railway vehicle, a watercraft, a roof and exterior wall of a building, a window glass, a bridge girder, a road traffic sign, a traffic signal, a signboard, a vending machine, and a solar panel; and an antifouling coating agent for exterior of a device and component. Among them, the curable composition is suitably used as an antifouling coating agent for use of an automobile, a motorcycle, a bicycle, a building machine, an agricultural machine, an aircraft, a railway vehicle, and a watercraft. As the antifouling coating agent use for an automobile, the curable composition is used for a coating agent for, for example, a vehicle, a headlamp, an aluminum wheel, a sheet, and an interior component.

[Article]

Furthermore, according to another aspect of the present invention, an article on which the cured coating obtained by curing the curable composition is formed is also provided. Examples of the article include an automobile, a motorcycle, a bicycle, a railway vehicle, a solar panel, a vending machine, and a building. That is, according to another aspect of the present invention, an article including the cured coating obtained by curing the above curable composition is also provided, and the article is selected from the group consisting of an automobile, a motorcycle, a bicycle, a railway vehicle, a solar panel, a vending machine, and a building.

EXAMPLES

Hereinafter, the present invention will be described in more detail with Examples, but the present invention is not limited to these Examples. Unless otherwise described, operations, tests, and the like are performed under an environment at 25° C. and 55% RH. A concentration and % respectively refer to a mass concentration and % by mass unless otherwise mentioned, and a ratio is a mass ratio unless otherwise mentioned.

<Preparation of Curable Composition>

Each component was weighed so as to be a composition shown in Table 1 (unit: parts by mass), and mixed at a normal temperature for 60 minutes with a mixer to obtain a curable composition. Detailed amounts added (contents) were in accordance with Table 1, and all the values in Table 1 are described on parts by mass. A blank indicates that the corresponding component was not added.

—Synthesis of Polysiloxazane 1

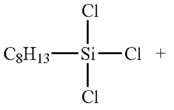

-continued

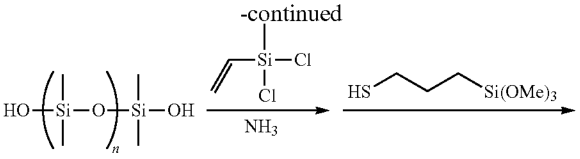

Polysiloxazane 1

(In the formula, Me represents a methyl group, and n is 40. The same applies hereinafter.)

An inside of a four-neck glass flask equipped with a stirrer, a gas-feeding tube, a thermometer, and a reflux cooler was substituted with nitrogen. With passing nitrogen gas on an open end of an upper part of the reflux cooler to prevent an outside air from entering, 65.9 g (0.300 mol) of n-hexyltrichlorosilane (the above chlorosilane compound (5)), 45.0 g (0.015 mol) of a silicone compound silanol-modified at both terminals (the above silicone oil OH-modified at both terminals (4)) having a kinematic viscosity at 25° C. of 60 $mm^2/s$, and 295.6 g of cyclopentyl methyl ether (hereinafter, referred to as "CPME") as a solvent were added, and the mixture was stirred at a room temperature for 1 hour. Into this mixture, 42.3 g (0.300 mol) of methylvinyldichlorosilane (the above chlorosilane compound (7)) and 76.8 g of CPME were added and stirred to obtain a uniform reaction liquid. The reaction liquid was cooled to 10° C. or lower, and ammonia gas was fed through the feeding tube into the reaction liquid. With cooling the reaction liquid so that the temperature thereof did not exceed 30° C., ammonia was continuously fed over 6 hours. The obtained reaction liquid was filtered, and the residue was washed with CPME. The filtrate was concentrated, and 110.9 g of toluene was added into 110.9 g of the obtained condensed product to obtain 221.8 g of a colorless clear solution.

Subsequently, an inside of a four-neck glass flask equipped with a stirrer, a thermometer, a reflux cooler, and a dropping funnel was substituted with nitrogen, 16.9 g (0.086 mol) of mercaptopropyltrimethoxysilane (the above mercapto-group-containing silane compound (9)) and 16.9 g of toluene were added, and the mixture was heated to 90° C. Into this mixture, a mixture of 80.0 g of the colorless clear solution obtained above and 0.168 g (0.000874 mol) of 2,2'-azobis(2-methylbutyronitrile) was added through the dropping funnel over 2.5 hours, and the mixture was stirred for 1 hour with keeping the same temperature to obtain a polysiloxazane 1.

Into the obtained polysiloxazane 1, an isoparaffin solvent (IP Solvent 1620, manufactured by Idemitsu Kosan Co., Ltd., the same applies hereinafter.) was added to substitute the solvent, and a nonvolatile component concentration was adjusted to 50%. This was specified as a composition 1 of the polysiloxazane 1. The obtained composition 1 was subjected to IR analysis, and consequently, peaks derived from a Si—N—Si structure (932 $cm^{-1}$ and 1,190 $cm^{-1}$), a peak derived from Si—O—Si (1,092 $cm^{-1}$), and a peak derived from NH (3,391 $cm^{-1}$) were observed. GPC analysis supported generation of the target polysiloxazane 1 having a weight-average molecular weight of 5,300 and a number-average molecular weight of 2,600. FIG. 1 shows the IR spectrum.

<Component (A) and Comparative Component>

A1: A composition (solid content of 20% by mass) obtained by dissolving and diluting, with the isoparaffin solvent (IP Solvent 1620, manufactured by Idemitsu Kosan Co., Ltd.), the polysiloxazane 1 containing constituent units a to d represented by the formula (1) in which a mole ratio between the constituent units a:b:c:d is 18:4:16:1, m is 0, n is 40, $R^1$ is a n-hexyl group, $R^2$ is a methyl group, the weight-average molecular weight is 5,300, and the number-average molecular weight is 2,600. In Table, only the mass of the solid content (resin component) is described for the amount of the corresponding component added (content), and the isoparaffin solvent is also described in the column (D2).

A'1: An organic polysilazane compound (KiON® HTA1500 Slow Cure, manufactured by AZ Electronic Materials SA) with 100% of the effective component (solid content).

<Components (B) and Comparative Component>

B1: A silicone compound (silicone oligomer) having a kinematic viscosity at 25° C. of 25 $mm^2/s$ and having methoxy groups at the side chain and both the terminals (KR-500, manufactured by Shin-Etsu Chemical Co., Ltd.).

B2: A silicone compound having a kinematic viscosity at 25° C. of 14 $mm^2/s$ in which $R^4$, $R^5$, $R^8$, and $R^9$ in the formula (10) are each a methoxy group, $R^6$ and $R^7$ are each a methyl group, and $X^1$ and $X^2$ are each a methoxy group (X-40-2090, manufactured by Shin-Etsu Chemical Co., Ltd.).

B3: A silicone compound having a kinematic viscosity at 25° C. of 60 $mm^2/s$ in which $R^4$ to $R^9$ in the formula (10) are each a methyl group, and $X^1$ and $X^2$ are each a hydroxy group (KF-9701, manufactured by Shin-Etsu Chemical Co., Ltd.).

B4: A silicone compound having a kinematic viscosity at 25° C. of 35 $mm^2/s$ in which $R^4$ to $R^9$ in the formula (10) are each a methyl group, and $X^1$ and $X^2$ are each a carbinol group represented by $—CH_2CH_2CH_2OCH_2CH_2OH$ (X-22-160AS, manufactured by Shin-Etsu Chemical Co., Ltd.).

B5: A silicone compound having a kinematic viscosity at 25° C. of 40 $mm^2/s$ in which $R^4$ to $R^9$ in the formula (10) are each a methyl group, and any one of $X^1$ and $X^2$ is a carbinol group represented by $—CH_2CH_2CH_2OCH_2CH_2OH$ and the other of $X^1$ and $X^2$ is a methyl group (that is, one terminal is carbinol group represented by $—CH_2CH_2CH_2OCH_2CH_2OH$ and the other terminal is a methyl group) (X-22-170BX, manufactured by Shin-Etsu Chemical Co., Ltd.).

B6: A silicone compound having a kinematic viscosity at 25° C. of 130 $mm^2/s$ in which $R^4$ to $R^9$ in the formula (10) are each a methyl group, and any one of $X^1$ and $X^2$ is a carbinol group represented by the formula (11) and the other of $X^1$ and $X^2$ is a methyl group (here, $R^{10}$ in the formula (11) is $—CH_2CH_2CH_2OCH_2—$, both $R^{11}$ and $R^{12}$ are $CH_2$, and $R^{13}$ is represented by $—CH_2CH_3$) (X-22-176DX, manufactured by Shin-Etsu Chemical Co., Ltd.).

B7: A silicone compound having a kinematic viscosity at 25° C. of 8 $mm^2/s$ in which $R^4$ to $R^9$ in the formula (10) are each a methyl group, and $X^1$ and $X^2$ are each a hydroxy group (XC96-C7123, manufactured by Momentive Performance Materials Inc.).

B'1: A silicone compound having a kinematic viscosity at 25° C. of 55 $mm^2/s$ in which $R^4$ to $R^9$ in the formula (10) are each a methyl group, and $X^1$ and $X^2$ are each an amino group (X-22-161B, manufactured by Shin-Etsu Chemical Co., Ltd.).

<Components (C)>

C1: An organotitanium compound (D-25, manufactured by Shin-Etsu Chemical Co., Ltd.).

C2: An aluminum chelate compound (DX-9740, manufactured by Shin-Etsu Chemical Co., Ltd.).

<Components (D)>

D1: An isoparaffin solvent containing isododecane (MARUKASOL®, manufactured by Maruzen Petrochemical Co., Ltd.).

D2: An isoparaffin solvent (IP Solvent 1620, manufactured by Idemitsu Kosan Co., Ltd.).

Each of characteristics was evaluated under the following conditions.

<Production of Specimen>

A nonwoven cloth was sufficiently impregnated with each of the curable compositions, and each of the curable compositions was thinly applied and spread by hand on a surface of a black-painted sheet (material: SPCC-SD, size: 0.8 mm×70 mm×150 mm, a product by ASAHI-BETECHNO). Then, an excess curable composition was wiped away by using a dry microfiber cloth, and left to stand under an environment at 25° C. and 55% RH for 30 minutes, 24 hours, or 168 hours to be cured to produce three types of specimens.

<Evaluation of Water Contact Angle>

On each surface of the specimens produced in the <Production of Specimen> and cured by leaving to stand for 24 hours, one drop (0.005 mL) of ion-exchanged water was dropped with a dropper. A contact angle with water on the substrate (specimen) surface in this time was measured by using a contact angle meter (DM-500, manufactured by Kyowa Interface Science Co., Ltd.) to evaluate the water contact angle. Table 1 shows the results. The water contact angle of the curable composition of the present invention is preferably a value of 97 degrees or more, and more preferably a value of 99 degrees or more. Meanwhile, an upper limit thereof is not particularly limited, and 150 degrees or less.

<Evaluation of Coating Stability of Initial Working>

On each surface of the specimens produced in the <Production of Specimen> and cured by leaving to stand for 30 minutes or 24 hours, one drop (0.005 mL) of ion-exchanged water was dropped with a dropper. A contact angle with water on the substrate (specimen) surface in this time was measured by using a contact angle meter (DM-500, manufactured by Kyowa Interface Science Co., Ltd.) to evaluate the water contact angle. Table 1 shows the results of calculated coating stability in the initial working by the following expression. The coating stability in the initial working (%) is preferably 97% or more from the viewpoint of the stability in initial curing. Meanwhile, an upper limit thereof is not particularly limited, and 120% or less.

Coating stability in initial working (%)=(Water contact angle of specimen cured by leaving to stand for 24 hours/Water contact angle of specimen cured by leaving to stand for 30 minutes)×100 Expression 1

<Method for Evaluating Sliding Angle>

On each surface of the specimens produced in the <Production of Specimen> and cured by leaving to stand for 168 hours, one drop (approximately 0.05 mL) of ion-exchanged water was dropped with a dropper. The specimen was gradually tilted from this state to measure an angle at which the waterdrop was started to flow (sliding angle), and a value of the sliding angle was evaluated as an indicator of the sliding property (water sliding property). Table 1 shows the results. A desired sliding angle as the sliding property of the curable composition of the present invention is 20 degrees or less, and more preferably 18 degrees or less. Meanwhile, a lower limit thereof is not particularly limited, and 5 degrees or more.

TABLE 1

| | Example 1 | Example 2 | Example 3 | Example 4 | Example 5 | Example 6 | Example 7 | Example 8 | Example 9 |
|---|---|---|---|---|---|---|---|---|---|
| A1 | 100 | 100 | 100 | 100 | 100 | 100 | 100 | 100 | 100 |
| B1 | 50 | | | | | | | | |
| B2 | | 50 | | | | | | | |
| B3 | | | 50 | | | | | 100 | 200 |
| B4 | | | | 50 | | | | | |
| B5 | | | | | 50 | | | | |
| B6 | | | | | | 50 | | | |
| B7 | | | | | | | 50 | | |
| C1 | 5 | 5 | 5 | 5 | 5 | 5 | 5 | 5 | 5 |
| C2 | | | | | | | | | |
| D1 | 4000 | 4000 | 4000 | 4000 | 4000 | 4000 | 4000 | 4000 | 4000 |
| D2 | 400 | 400 | 400 | 400 | 400 | 400 | 400 | 400 | 400 |
| Water contact angle (°) | 98.5 | 99.1 | 99.7 | 99.7 | 99.0 | 99.1 | 97.2 | 99.1 | 101.5 |
| Coating stability in initial working | 97.6% | 97.7% | 99.6% | 98.4% | 98.1% | 100.0% | 98.8% | 99.9% | 100.2% |
| Sliding angle (°) | 14 | 14 | 16 | 9 | 14 | 16 | 16 | 16 | 16 |

| | Comparative Example 1 | Comparative Example 2 | Comparative Example 3 |
|---|---|---|---|
| A1 | 100 | | 100 |
| A'1 | | 100 | |
| B1 | | | |
| B2 | | | |
| B3 | | 50 | |
| B4 | | | |
| B5 | | | |
| B6 | | | |
| B7 | | | |
| B'1 | | | 50 |
| C1 | | 5 | 5 |
| C2 | 10 | | |
| D1 | 4000 | 4000 | 4000 |
| D2 | 400 | | 400 |
| Water contact angle (°) | 99.0 | 98.7 | 100.5 |
| Coating stability in initial working | 96.4% | 99.4% | 94.6% |
| Sliding angle (°) | 14 | 22 | 26 |

From the results of Examples 1 to 9 in Table 1, it is found that the curable composition according to the present invention can form a coating having excellent water repellency and sliding property and that has excellent coating stability in initial working.

Comparative Example 1 in Table 1 is a curable composition excluding (absence of) the component (B) of the present invention, and this curable composition is found to have poor coating stability in the initial working. Comparative Example 2 is a curable composition using the organic polysilazane compound that is not the component (A) of the present invention, and this curable composition is found to be poor from the viewpoint of the sliding angle. Comparative Example 3 is a curable composition using the reactive silicone compound amino-modified at both terminals that is not the component (B) of the present invention, and this curable composition is found to be poor from the viewpoint of the coating stability in the initial working and the sliding angle.

INDUSTRIAL APPLICABILITY

The present invention can provide a curable composition that can form a coating having excellent water repellency and sliding property, and that also has excellent coating stability in the initial working. Therefore, the present invention can be used as a curable composition in the fields such as automobiles, and thus is industrially useful.

The present application is based on Japanese Patent Application No. 2021-043634, filed on Mar. 17, 2021, and the disclosed content thereof is incorporated herein by reference in its entirety.

The invention claimed is:

1. A curable composition comprising:

a component (A) that is a polysiloxazane compound having a weight-average molecular weight of 3,000 to 10,000 and a number-average molecular weight of 2,000 to 8,000; and a component (B) that is a silicone compound having a hydroxy group, wherein the component (A) contains constituent units a to d represented by the formula (1), and a mole ratio between each of the constituent units a:b:c:d is 5 to 15:1 to 3:6 to 10:0.5 to 1.5:

(1)

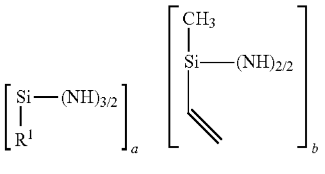

-continued

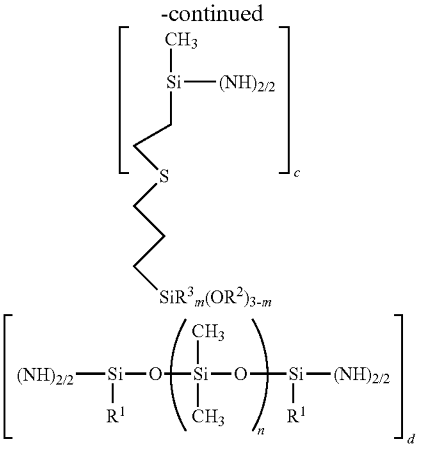

in the formula (1), $R^1$ represents an unsubstituted monovalent alkyl group having 3 to 10 carbon atoms, and $R^2$ and $R^3$ each independently represent an unsubstituted monovalent alkyl group having 1 to 6 carbon atoms; and m is 0 or 1, and n is an integer of 30 to 100.

2. The curable composition according to claim 1, wherein m in the component (A) is 0.

3. The curable composition according to claim 1, wherein $R^1$ in the component (A) is an unsubstituted monovalent alkyl group having 4 to 8 carbon atoms.

4. The curable composition according to claim 1, wherein the component (B) has a kinematic viscosity at 25° C. of 1 to 500 $mm^2/s$.

5. The curable composition according to claim 1, wherein the component (B) contains a silicone compound having, at a terminal, one or more functional groups selected from the group consisting of a silanol group and a carbinol group.

6. The curable composition according to claim 1, wherein the component (B) is contained in an amount of 0.1 to 500 parts by mass relative to 100 parts by mass of the component (A).

7. The curable composition according to claim 1, further comprising a catalyst as a component (C).

8. The curable composition according to claim 7, wherein the component (C) contains one or more compounds selected from the group consisting of an organotin compound, an organotitanium compound, an organoaluminum compound, an aluminum salt compound, an organozinc compound, an organozirconium compound, an inorganic acid compound, an organic acid compound, an inorganic base compound, and an organic base compound.

9. The curable composition according to claim 1, further comprising an organic solvent as a component (D).

10. The curable composition according to claim 9, wherein the component (D) is an aromatic hydrocarbon solvent or an aliphatic hydrocarbon solvent.

11. The curable composition according to claim 9, wherein the component (D) is contained in an amount of 200 to 15,000 parts by mass relative to 100 parts by mass of the component (A).

12. The curable composition according to claim 1, wherein the curable composition is used for forming a coating on a surface of a substrate selected from the group consisting of a metal, a glass, a ceramic, a plastic, a fiber, a steel sheet, and an exterior steel sheet.

13. A cured coating obtained by curing the curable composition set forth in claim 1.

14. An article comprising the cured coating set forth in claim 13, wherein the article is selected from the group consisting of an automobile, a motorcycle, a bicycle, a railway vehicle, a solar panel, a vending machine, and a building.

15. A method for forming a coating, comprising applying the curable composition set forth in claim 1 onto a substrate surface, and curing the curable composition on the substrate surface.

16. The curable composition according to claim 1, wherein the component (B) is a silicone compound represented by the formula (10):

(10)

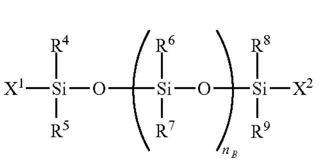

in the formula (10), $R^4$ to $R^9$ each independently represent an alkyl group having 1 to 20 carbon atoms; $X^1$ and $X^2$ each independently represent an alkyl group having 1 to 20 carbon atoms, a hydroxy group, or a carbinol group, and at least one of $X^1$ and $X^2$ is a hydroxy group or a carbinol group; and np is 5 to 850.

17. The curable composition according to claim 16, wherein the at least one of $X^1$ and $X^2$ in the formula (10) is a carbinol group represented by the formula (11) or the formula (12), or a hydroxy group:

(11)

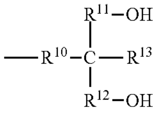

in the formula (11), $R^{10}$, $R^{11}$, and $R^{12}$ each independently represent an alkylene group having 1 to 20 carbon atoms or an oxyalkylene group having 1 to 20 carbon atoms; and $R^{13}$ represents an alkyl group having 1 to 20 carbon atoms;

$$—R^{14}—O—R^{15}—OH \quad (12)$$

in the formula (12), $R^{14}$ and $R^{15}$ each independently represent an alkylene group having 1 to 10 carbon atoms.

18. The curable composition according to claim 17, wherein at least one of $X^1$ and $X^2$ in the formula (10) is the carbinol group represented by the formula (11), or a hydroxy group.

19. The curable composition according to claim 18, wherein $R^4$ to $R^9$ in the formula (10) each independently represent an alkyl group having 1 to 5 carbon atoms.

20. A curable composition consisting of:

a component (A) that is a polysiloxazane compound having a weight-average molecular weight of 3,000 to 10,000 and a number-average molecular weight of 2,000 to 8,000;

a component (B) that is a silicone compound having a hydroxy group, wherein the component (A) contains constituent units a to d represented by the formula (1), and a mole ratio between each of the constituent units a:b:c:d is 5 to 15:1 to 3:6 to 10:0.5 to 1.5:

(1)

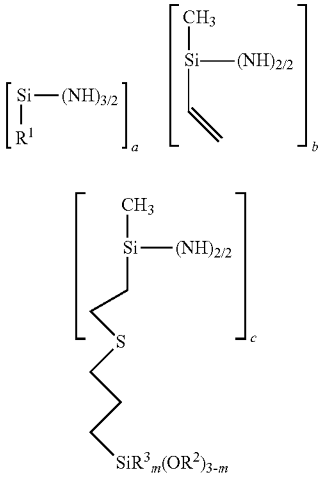

-continued

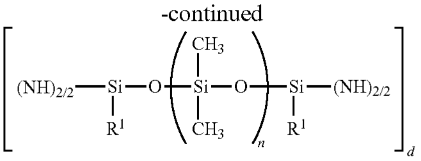

in the formula (1), $R^1$ represents an unsubstituted monovalent alkyl group having 3 to 10 carbon atoms, and $R^2$ and $R^3$ each independently represent an unsubstituted monovalent alkyl group having 1 to 6 carbon atoms; and m is 0 or 1, and n is an integer of 30 to 100;

a component (C) that is a catalyst;

a component (D) that is an organic solvent; and optionally at least one selected from the group consisting of an aging inhibitor, a rust preventing agent, an antifungal agent, a colorant, a surfactant, a rheology regulating agent, an ultraviolet absorbent, a fluorescent agent, a polishing agent, a perfume agent, and a filler.

* * * * *